United States Patent [19]

Wallis

[11] Patent Number: 4,735,303

[45] Date of Patent: Apr. 5, 1988

[54] TRANSFER APPARATUS

[76] Inventor: Bernard J. Wallis, 2215 Dacosta, Dearborn, Mich. 48128

[21] Appl. No.: 900,363

[22] Filed: Aug. 26, 1986

[51] Int. Cl.⁴ .............................................. B65G 25/00
[52] U.S. Cl. .................................... 198/621; 414/751; 72/405
[58] Field of Search .............. 414/749, 750, 751, 736; 198/621; 72/405

[56] References Cited

U.S. PATENT DOCUMENTS

| 3,077,259 | 2/1963 | Braun | 198/621 X |
|---|---|---|---|
| 3,417,596 | 12/1968 | Richter | 72/405 X |
| 3,421,637 | 1/1969 | Sofy | 414/750 |
| 3,432,042 | 3/1969 | Bautz et al. | 198/621 |
| 3,655,070 | 4/1972 | Haydu | 198/621 |
| 3,760,957 | 9/1973 | Berger | 198/621 X |
| 3,885,680 | 5/1975 | Rasenberger | 414/751 |
| 3,939,992 | 2/1976 | Mikulec | 414/750 |
| 4,133,199 | 1/1979 | Shirao | 72/405 |
| 4,404,837 | 9/1983 | Allen et al. | 198/621 X |
| 4,540,087 | 9/1985 | Mizumoto | 198/621 |
| 4,577,748 | 3/1986 | Boegner et al. | 414/749 X |
| 4,627,528 | 12/1986 | Mikusch et al. | 198/621 |

Primary Examiner—L. J. Paperner
Assistant Examiner—Jennifer Doyle
Attorney, Agent, or Firm—Barnes, Kisselle, Raisch, Choate, Whittemore & Hulbert

[57] ABSTRACT

A transfer apparatus operable in connection with the reciprocating movement of a press to grasp and successively hold and move workpieces operated upon by the press comprising a plurality of opposed longitudinally spaced gripping members mounted to move transversely for gripping a plurality of workpieces, moving the workpieces longitudinally and thereafter releasing the workpieces so that the gripping member can be returned for successive cycles. Each of the movements is controlled by a vertically movable cam and a cam follower urged against its respective cam and interconnected by mechanical linkage to cause the gripping members to move inwardly to engage workpieces, longitudinally to move the workpieces, and outwardly to disengage the workpieces.

10 Claims, 4 Drawing Sheets

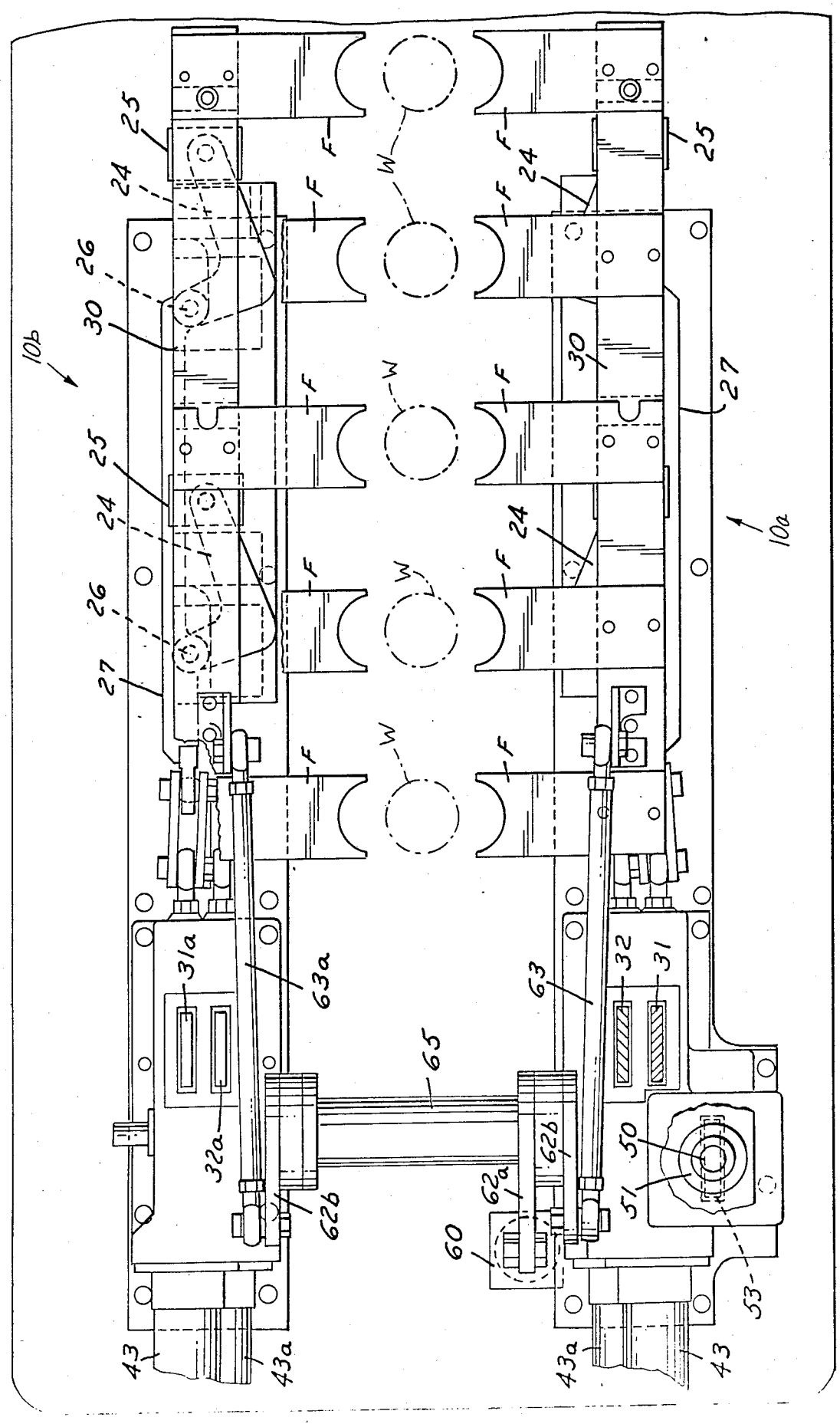

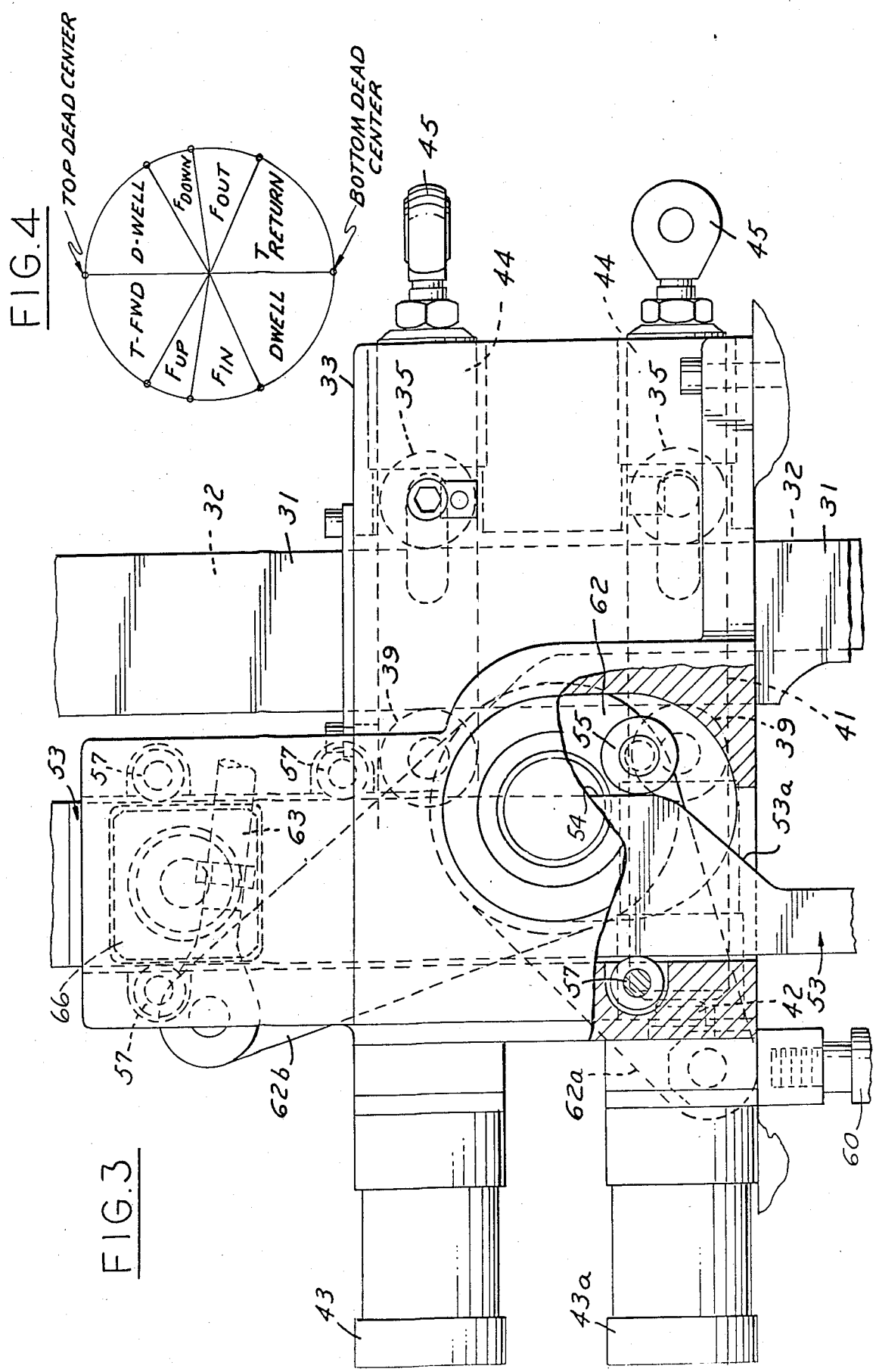

TRANSFER APPARATUS

This invention relates to transfer apparatus associated with a press to hold and move workpieces acted upon by the press.

BACKGROUND AND SUMMARY OF THE INVENTION

Various transfer apparatus have heretofore been proposed including my U.S. Pat. Nos. 2,292,485, 3,135,995, 3,165,192, 3,381,793, 3,397,799, 3,411,636, 3,521,760, 3,521,761, 3,541,834, 3,661,247, 3,731,821, 3,738,503, 3,746,184, 3,756,425, 4,032,018, 4,088,034, 4,089,203 and 4,311,429. Other patents showing mechanically driven transfer devices or apparatus include U.S. Pat. Nos. 3,421,637, 4,198,845 and 4,513,602.

Among the objectives of the present invention are to provide an improved transfer apparatus which has a minimal number of parts, which has a low silhouette so that it does not interfere with the dies or press, which embodies simple movements, which has no backlash, minimum friction, which can be expanded readily to accommodate a minimum number of parts which has minimal inertia, and which is simple to maintain.

In accordance with the invention, a transfer apparatus operable in connection with the reciprocating movement of a press to grasp and successively hold and move workpieces operated upon by the press comprising a plurality of opposed longitudinally spaced gripping members mounted to move transversely for gripping a plurality of workpieces, moving the workpieces longitudinally and thereafter releasing the workpieces so that the gripping member can be returned for successive cycles. Each of the movements is controlled by a vertically movable cam and a cam follower urged against its respective cam and interconnected by mechanical linkage to cause the gripping members to move inwardly to engage workpieces, longitudinally to move the workpieces, and outwardly to disengage the workpieces.

DESCRIPTION OF THE DRAWINGS

FIG. 2 is a plan view of the transfer apparatus.

FIG. 3 is a fragmentary side elvational view of a portion of the apparatus.

FIG. 4 is a cycle diagram.

DESCRIPTION

Figure 1:
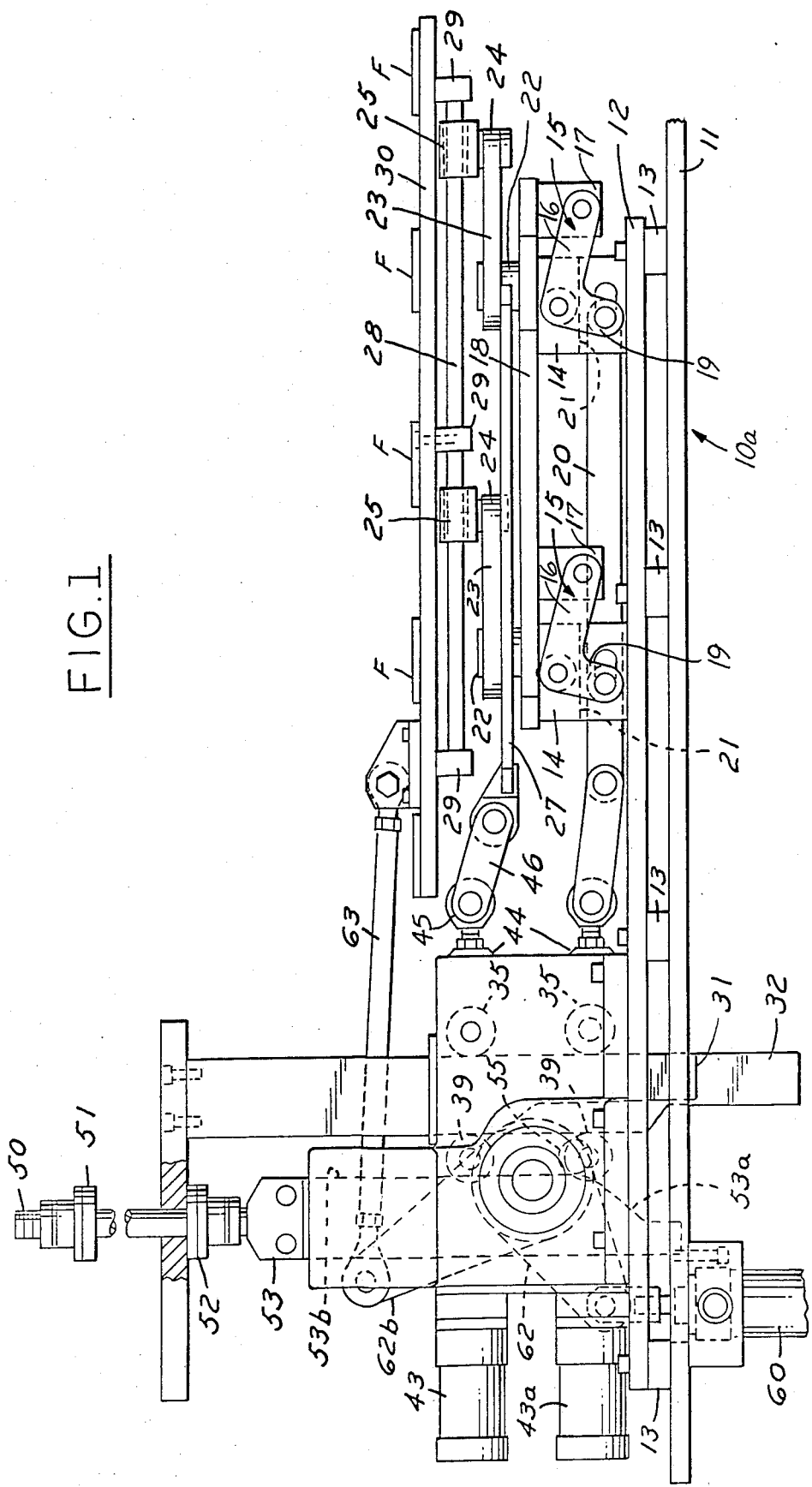
FIG. 1 is an elevational view of the transfer apparatus.
Figure 5:
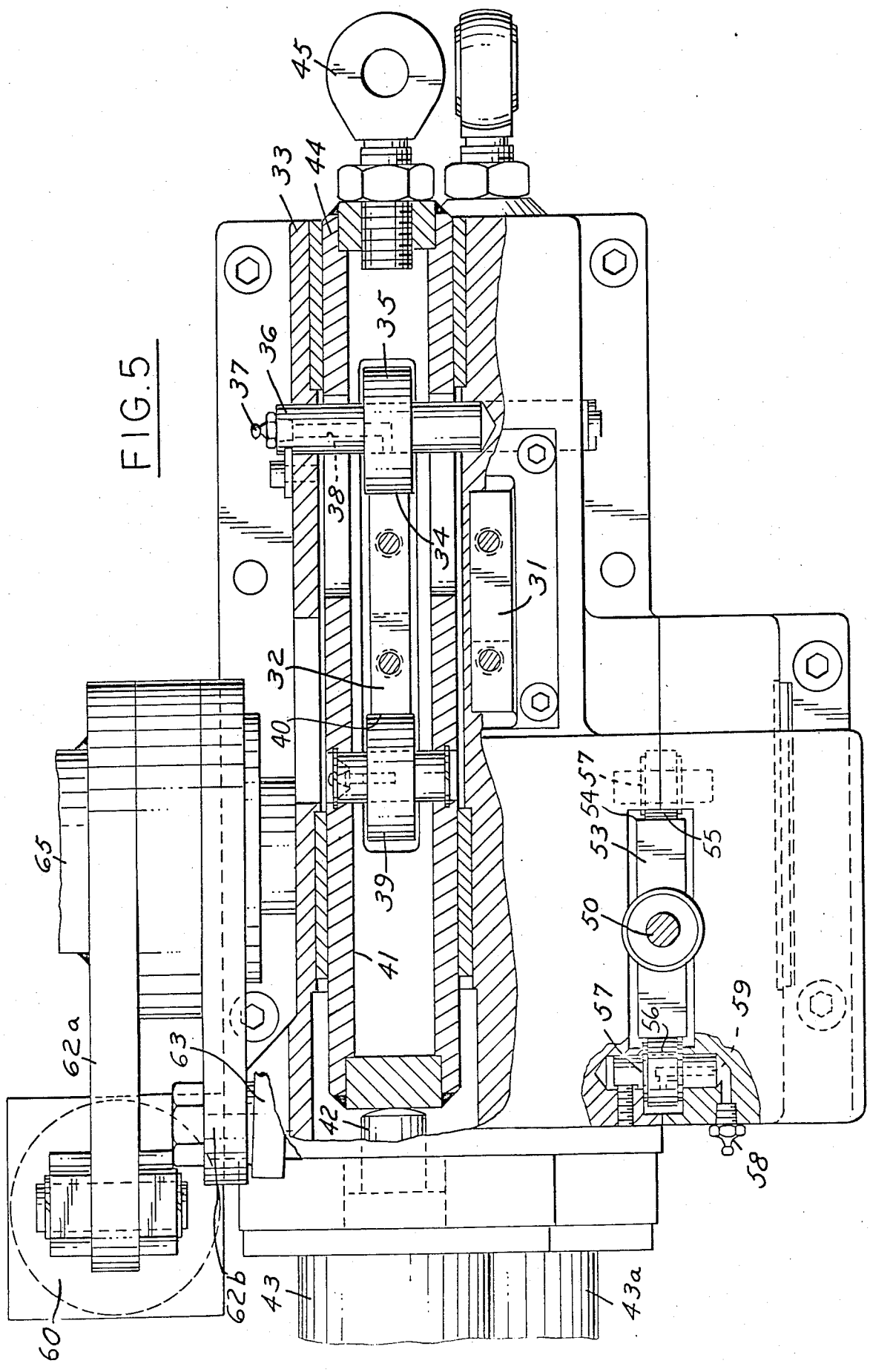
FIG. 5 is a part sectional view on an enlarged scale of a portion of the apparatus.

Referring to FIGS. 1–3, the transfer apparatus embodying the invention is adapted to be associated with a press and to function directly upon reciprocating movement of the press or by a motor in timed relation to the movement of the press to provide three distinct type of movements to a plurality of gripping devices or fingers such as fingers F, namely, move the fingers inwardly to grip workpieces W, move the workpieces up for operation thereon by the dies operated by a ram of the press, move the fingers up to lift the workpieces, transfer the workpieces longitudinally, and move the fingers out to release the workpieces, and then return the fingers longitudinally for the beginning of another cycle, as shown diagrammatically in the cycle diagram of FIG. 4.

The apparatus for moving the fingers F comprises a pair of mirror image substantially identical assemblies 10a, 10b adapted to be mounted on the sides of dies in a press wherein the dies perform successive forming operations on a workpiece.

Each assembly 10a, 10b includes a base plate 11 which in turn supports an intermediate plate 12 through blocks 13. Longitudinally spaced fixed blocks 14 on plate 12 pivotally support cranks 15 about a horizontal axis intermediate there ends. One end 16 of each crank 15 is pivoted about a horizontal axis to blocks 17 on a lift plate 18. The other end 19 of each crank 15 is pivoted about a horizontal axis to a left bar 20 that is guided through openings 21 in blocks 14. Bar 20 is adapted to be reciprocated, as presently described, to lift and lower plate 18.

Lift plate 18 supports fixed blocks 22 which pivotally support cranks 23 intermediate their ends. One end 24 of each crank 23 is pivoted about a vertical axis to a slide block 25. The other end 26 of each crank 23 is pivoted about a vertical axis to a longitudinal bar 27 which is reciprocated, as presently described.

Each slide block 25 is mounted for longitudinal movement on longitudinally spaced shafts 28 which are fixed on blocks 29 on the underside of a finger support plate 30 on which the gripping members for fingers F are fixed. Oscillation of cranks 24 will move finger support plate 30 inwardly and outwardly to move the fingers F in and out. The finger support plate 30 is adapted to be moved longitudinally by a mechanism and linkage presently to be described.

The reciprocating movement of the lift bars 20, 27 is achieved by the vertical reciprocating movement of associated flat cams 31, 32 connected for movement with the ram. Each cam 31, 32 is mounted for reciprocating vertical movement in a housing 33 and is generally rectangular in cross section. The linkages to the lift bar 20 and bar 27 are substantially identical and for clarity only the linkage to the bar 27 will be described.

Cam 32 has a vertical edge 34 thereof in abutment with a fixed roller 35 rotatably mounted about a horizontal axis on a shaft 37 in housing 33 formed with a grease fitting 37 and grease passage 38. A cam following roller 39 is rotatably mounted on a tubular intermediate piston rod 41 which is guided for horizontal movement in housing 33. Rod 29 is, in turn, engaged by the piston rod 42 of an associated pneumatic cylinder 43 which maintains the roller 39 against the cam surface 41 of cam 32. The end 44 of the intermediate rod 41 is provided with a clevis 45, respectively, pivotally connected by links 46 to the longitudinally extending links 25. As the ram is reciprocated, the roller 39 moves along the cam surface 40 and is maintained against the cam surface 40 by the pneumatic cylinder 43. As cam follower roller 39 reaches a different portion of the cam surface 40, it is permitted to move and, in turn, permit the intermediate piston rods 41 to move and cause the required upward and downward movement of the respective slides 27.

The longitudinal reciprocating movement of the slide 10 is achieved by a connection to the up and down movement of the ram through an threaded rod 50 which functions upon reciprocating movement of the ram with a time delay provided by the distance between shock absorbing devices 51, 52 to move a cam 53 upwardly and downwardly. The cam 53 is rectangular in cross section and includes a cam surface 54 along one edge that is engaged by a cam follower roller 55. A backup roller 56 is rotatably mounted on a horizontal shaft 57 in housing 33 which includes a grease fitting 58 and a grease passage 59. When the cam 53 is in the position shown in FIG. 3, the cam follower roller 55 is yieldingly urged toward the cam surface 54 by a pneumatic cylinder 60, which urges a crank arm 62a on which roller 55 is mounted and thereby urges the roller 55 against the cam surface 54. When the cam 53 is raised to cause roller 55 to engage an inclined portion 53a of the cam 53, the crank arm 62a is permitted by the roller 55 to move in a clockwise direction under the action of the pneumatic motor 60. This rotates shaft 65 on which crank arm 62a is mounted to rotate a crank arm 62b to move the link 63 and, in turn, move the plate 30 to the right as viewed in FIGS. 1 and 2. When the cam 53 is moved downwardly, the roller 55 returns to the straight portion 53b against the action of the pneumatic cylinder 60 moving the transfer plate 30 longitudinally to the left.

The ends of the link 63 are universally connected to the plate 30 to provide the reciprocating longitudinal and transverse movement of the plate 30 and, in turn, the fingers F.

Similarly, a mechanism provides for transmitting motion from cam 31 to left bar 20 to cause the finger support plate in and out.

Referring to FIG. 2, it can be seen that duplicate mechanisms are provided on each side of the path of travel of the workpieces. As shown, the mechanism for reciprocating the transfer plates 30 on one side is connected to the opposite side through a common shaft 65. Alternatively, the mechanism on the other side could be provided with its own associated cam.

Cam 53 has yieldingly urged friction pads 66 engaging the sides thereof to hold the cam 53 and prevent its movement except by the action of shaft.

In some instances, depending on the nature of the workpiece and the dies, it may be necessary only to move the workpieces in two instead of three movement in each cycle. For example, the workpieces may only need to be gripped and transferred longitudinally. In such a case, the associated linkage for the third movement, namely, raising and lowering, can be omitted from the housing.

Although the apparatus has been described as preferably being connected directly to movement of the ram of the press, it can also be utilized so that the cams are driven by electric or hydraulic motors operating in timed relation to the press through electronic controls.

I claim:

1. A transfer apparatus operable in timed relation with the reciprocating movement of a press to grasp, hold and move workpieces operated upon by the press upon each cycle of the press comprising
   a plurality of opposed sets of gripping members,
   a mounting member supporting each set of gripping members in longitudinally spaced relation,
   means for mounting said mounting member for moving the workpieces longitudinally when they are gripped by the gripping members and returning the mounting member to its original position after they have been moved longitudinally,
   and means for supporting said mounting member for movement transversely inwardly and outwardly for gripping and releasing the workpieces,
   and means for supporting said last-mentioned means for vertical movement for raising and lowering the workpieces,
   means for moving said mounting member longitudinally comprising a slide,
   a first vertically movable cam,
   a first cam follower,
   means yieldingly urging said cam against said cam follower,
   and linkage means between said cam follower and said mounting member whereby upon vertical reciprocating movement of the cam synchronously with the reciprocating movement of the press, the cam follower is moved horizontally under the action of said yielding means to move said mounting member longitudinally,
   said means for mounting said mounting member for movement transversely inwardly and outwardly comprising a lift plate,
   longitudinally spaced crank arms mounted for pivotal movement about a vertical axes on the lift plate,
   one end of each crank arm being fixed for pivotal movement about a vertical axis on the underside of said mounting member,
   the other ends of said crank arms being interconnected to one another by a link,
   a second vertically movable cam,
   a second cam follower,
   second means for yieldingly urging the second cam follower against said second cam and linkage interconnecting said link and said cam follower such that when th second cam is moved vertically, the crank arms on said lift plate cause the mounting member to move inwardly and outwardly to grip and disengage the workpieces,
   said means for lifting and lowering said workpieces comprising a base plate,
   a second set of longitudinally spaced crank arms pivoted intermediate their ends on the base plate,
   one end of said crank arms being pivoted about horizontal axes to the underside of the lift plate,
   means interconnecting the other ends of said longitudinally spaced crank arms by a link,
   a third vertically movable cam,
   a third cam follower,
   third means for yieldingly urging the third cam follower into engagement with the third cam,
   and linkage means interconnecting the third cam follower and the link interconnecting the second set of crank arms whereby upon vertical reciprocating movement of the third cam, the third cam follower raises and lowers the lift plate synchronously with the reciprocating movement of the press.

2. The transfer apparatus set forth in claim 1 wherein said means yieldingly urging the cam followers into engagement with the respective cams comprises individual pneumatic motors.

3. The transfer apparatus set forth in claim 2 wherein each of said second and third pneumatic motors has a shaft,
   a reciprocable member engaged by said shaft,
   said second and third cam followers being mounted respectively on said members and interconnected to the respective linkages.

4. A transfer apparatus operable in timed relation with the reciprocating movement of a press to grasp, hold and move workpieces operated upon by the press upon each cycle of the press comprising
   a plurality of opposed sets of gripping members,
   a mounting member supporting each set of gripping members in longitudinally spaced relation,
   means for mounting said mounting member for moving the workpieces longitudinally when they are gripped by the gripping members and returning the mounting member to its original position after they have been moved longitudinally, and means for supporting said mounting member for movement transversely inwardly and outwardly for gripping and releasing the workpieces, means for moving said mounting member longitudinally comprising a slide, a first vertically movable cam, a first cam follower, means yieldingly urging said cam against said cam follower, and linkage means between said cam follower and said mounting member whereby upon vertical reciprocating movement of the cam synchronously with the reciprocating movement of the press, the cam follower is moved horizontally under the action of said yielding means to move said mounting member longitudinally, said means for mounting said mounting member for movement transversely inwardly and outwardly comprising a lift plate, longitudinally spaced crank arms mounted for pivotal movement about vertical axes on the lift plate, one end of each crank arm being fixed for pivotal movement about a vertical axis on the underside of said mounting member, the other ends of said crank arms being interconnected to one another by a link, a second vertically movable cam, a second cam follower, second means for yieldingly urging the second cam follower against said second cam and linkage interconnecting said link and said cam follower such that as the second cam is moved vertically synchronously with the reciprocating movement of the press, the crank arms on said lift plate cause the mounting member to move inwardly and outwardly to grip and disengage the workpieces synchronously with the reciprocating movement of the press.

5. The transfer apparatus set forth in claim 4 wherein said means yieldingly urging the cam followers into engagement with the respective cams comprising individual pneumatic motors.

6. The transfer apparatus set forth in claim 5 wherein each said second pneumatic motor has a shaft, a reciprocable member engaged by said shaft, said second cam follower being mounted on said member and interconnected to the respective linkages.

7. A transfer apparatus operable in timed relation with the reciprocating movement of a press to grasp, hold and move workpieces operated upon by the press upon each cycle of the press comprising a plurality of opposed sets of gripping members, a mounting member supporting each set of gripping members in longitudinally spaced relation, means for mounting said mounting member for moving the workpieces longitudinally when they are gripped by the gripping members and returning the mounting member to its original position after they have been moved longitudinally, and means for supporting said mounting member for movement transversely inwardly and outwardly for gripping and releasing the workpieces, and means for supporting said last-mentioned means for vertical movement for raising and lowering the workpieces, means for moving said mounting member longitudinally, and means adapted to be connected between said press and said mounting member such that said mounting member is moved synchronously with the movement of the press, said means for mounting said mounting member for movement transversely inwardly and outwardly comprising a lift plate, longitudinally spaced crank arms mounted for pivotal movement about vertical axes on the lift plate, one end of each crank arm being fixed for pivotal movement about a vertical axis on the underside of said mounting member, the other ends of said crank arms being interconnected to one another by a link, means adapted to be connected between said press and said lift plate such that the crank arms on said lift plate cause the mounting member to move inwardly and outwardly to grip and disengage the workpieces, said means for lifting and lowering said workpieces comprising a base plate, a second set of longitudinally spaced crank arms pivoted intermediate their ends on the base plate, one end of said crank arms being pivoted about horizontal axes to the underside of the lift plate, means interconnecting the other ends of said longitudinally spaced crank arms being by a link.

8. A transfer apparatus operable in timed relation with the reciprocating movement of a press to grasp, hold and move workpieces operated upon by the press upon each cycle of the press comprising a plurality of opposed sets of gripping members, a mounting member supporting each set of gripping members in longitudinally spaced relation, means for mounting said mounting member for moving the workpieces longitudinally when they are gripped by the gripping members and returning the mounting member to its original position after they have been moved longitudinally, and means for supporting said mounting member for movement transversely inwardly and outwardly for gripping and releasing the workpieces, said means for moving said mounting member longitudinally, and means adapted to be connected between said press and said mounting member such that said mounting member is moved synchronously with the movement of the press, said means for mounting said mounting member for movement transversely inwardly and outwardly comprising a lift member, longitudinally spaced crank arms mounted for pivotal movement about vertical axes on the lift plate, one end of each crank arm being fixed for pivotal movement about a vertical axis on the underside of said mounting plate, the other ends of said crank arms being interconnected to one another by a link, means adapted to be connected between said press and said lift plate such that the crank arms on said lift plate cause the mounting member to move inwardly and outwardly to grip and disengage the workpieces 9. A transfer apparatus operable in timed relation with the reciprocating movement of a press to grasp, hold and move workpieces operated upon by the press upon each cycle of the press comprising a plurality of opposed sets of gripping members, a mounting member supporting each set of gripping members in longitudinally spaced relation, means for mounting said mounting member for moving the workpieces longitudinally when they are gripped by the gripping members and returning the mounting member to its original position after they have been moved longitudinally, and means for supporting said mounting member for movement transversely inwardly and outwardly for gripping and releasing the workpieces, and means for supporting said last-mentioned means for vertical movement for raising and lowering the workpieces, means for moving said mounting member longitudinally comprising a slide, a first vertically movable cam, a first cam follower, means yieldingly urging said cam against said cam follower, and linkage means between said cam follower and said mounting member whereby upon vertical reciprocating movement of the cam synchronously with the reciprocating movement of the press, the cam follower is moved horizontally under the action of said yielding means to move said mounting member longitudinally, said means for supporting said mounting member for movement transversely inwardly and outwardly comprising a lift plate, longitudinally spaced crank arms mounted for pivotal movement about vertical axes on the lift plate, one end of each crank arm being fixed for pivotal movement about a vertical axis on the underside of said mounting member, the other ends of said crank arms being interconnected to one another by a link, a second vertically movable cam, a second cam follower, second means for yieldingly urging the second cam follower against said second cam and linkage interconnecting said link and said cam follower such that when the second cam is moved vertically, the crank arms on said lift plate cause the mounting member to move inwardly and outwardly to grip and disengage the workpieces, said means for lifting and lowering said workpieces comprising a base plate, a second set of longitudinally spaced crank arms pivoted intermediate their ends on the base plate, one end of said crank arms being pivoted about horizontal axes to the underside of the lift plate, means interconnecting the other ends of said longitudinally spaced crank arms by a link, a third vertically movable cam, a third cam follower, third means for yieldingly urging the third cam follower into engagement with the third cam, and linkage means interconnecting the third cam follower and the link interconnecting the second set of crank arms whereby upon vertical reciprocating movement of the third cam, the third cam follower raises and lowers the lift plate synchronously with the reciprocating movement of the press, said means yieldingly urging the cam followers into engagement with the respective cams comprising individual pneumatic motors, said first means yieldingly urging said cam follower against the first cam including a crank arm connected to the pneumatic motor, said first cam follower being mounted on said crank arm, a second crank arm movable in unison with said first crank arm, and a linkage interconnecting said crank arm and said mounting plate.

10. A transfer apparatus operable in timed relation with the reciprocating movement of a press to grasp, hold and move workpieces operated upon by the press upon each cycle of the press comprising a plurality of opposed sets of gripping members, a mounting member supporting each set of gripping members in longitudinally spaced relation, means for mounting said mounting member for moving the workpieces longitudinally when they are gripped by the gripping members and returning the mounting member to its original position after they have been moved longitudinally, and means for supporting said mounting member for movement transversely inwardly and outwardly for gripping and releasing the workpieces, said means for moving said mounting member longitudinally comprising a slide, a first vertically movable cam, a first cam follower, means yieldingly urging said cam against said cam follower, and linkage means between said cam follower and said mounting member whereby upon vertical reciprocating movement of the cam synchronously with the reciprocating movement of the press, the cam follower is moved horizontally under the action of said yielding means to move said mounting member longitudinally, said means for mounting said mounting member for movement transverse inwardly and outwardly comprising a lift plate, longitudinally spaced crank arms mounted for pivotal movement about vertical axes on the lift plate, one end of each crank arm being fixed for pivotal movement about a vertical axis on the underside of said mounting member, the other ends of said cranks arms being interconnected to one another by a link, a second vertically movable cam, a second cam follower, second means for yieldingly urging the second cam follower against said second cam and linkage interconnecting said link and said cam follower such that as the second cam is moved vertically synchronously with the reciprocating movement of the press, the crank arms on said lift plate cause the mounting member to move inwardly and outwardly to grip and disengage the workpieces synchronously with the reciprocating movement of the press, said means yieldingly urging the cam followers into engagement with the respective cams comprising individual pneumatic motors, said first means yieldingly urging said cam follower against the first cam including a crank arm connected to the pneumatic motor,
said first cam follower being mounted on said crank arm, a second crank arm movable in unison with said first crank arm,
and a linkage interconnecting said crank arm and said mounting member.

* * * * *